March 17, 1959

J. B. EVANS, JR

2,878,317

TRANSMISSION REGULATION

Filed Sept. 16, 1954

INVENTOR
J. B. EVANS JR.

BY
ATTORNEY

March 17, 1959     J. B. EVANS, JR     2,878,317
TRANSMISSION REGULATION Filed Sept. 16, 1954     8 Sheets-Sheet 4

INVENTOR
J. B. EVANS JR.
BY
Earl C. Laughlin
ATTORNEY

March 17, 1959  J. B. EVANS, JR  2,878,317
TRANSMISSION REGULATION

Filed Sept. 16, 1954  8 Sheets-Sheet 5

FIG. 7

SHAPE NO. 1

FIG. 8

SHAPE NO. 2

FIG. 9

SHAPE NO. 3

FIG. 10

SHAPE NO. 4

INVENTOR
J. B. EVANS JR.
BY
Earl C. Laughlin
ATTORNEY

LINE DATA × WEIGHTING = RESULTANT

FIG. 11D

12 FILTERS    WEIGHTING RESISTORS    RECTIFIERS

INVENTOR
J. B. EVANS JR.

FIG. 13

INVENTOR
J. B. EVANS JR.
BY
Earl C. Laughlin
ATTORNEY

United States Patent Office

2,878,317
Patented Mar. 17, 1959

2,878,317

TRANSMISSION REGULATION

James B. Evans, Jr., Chatham, N. J., assignor to Bell Telephone Laboratories, Incorporated, New York, N. Y., a corporation of New York Application September 16, 1954, Serial No. 456,523

6 Claims. (Cl. 179—15)

This invention relates to broad-frequency band carrier wave communication systems, and particularly to the automatic regulation of signal transmission over such systems.

The regulating arrangements of the invention are applicable to any type of broad band carrier signaling system transmitting the carrier, subject to extreme variations in temperature along its route. The transmission variations occurring in such a carrier system are proportional to the length of the system, the number of repeaters involved and the extent that transmission through each of the system components varies with operating temperature. Thus, the amount of transmission variation is a function of the temperature range in the area in which the system is used, which may vary considerably in different parts of the country.

A general object of the invention is to compensate automatically for the effects on signal transmission in a carrier signal transmission system of fortuitous changes in transmission conditions, such as variations in operating temperature, in power supply voltages and other unpredictable variations.

A more specific object is to regulate automatically signal transmission in a multi-channel, repeatered carrier signaling system, so as to compensate for the effects of varying transmission conditions, particularly extreme temperature deviations, on certain system components, for example, on the line and repeaters.

A related object is to enable the extension of the length of a multi-channel, repeatered carrier signaling system, otherwise restricted by signal distortion introduced by the effects of extreme variations in temperature or other unpredictable transmission conditions on the system components, by automatically correcting for such distortion.

These objects are attained in accordance with the invention by the use of a suitable deviation regulator at one or more repeater points in such a carrier system to provide automatically the necessary correction of the transmission frequency characteristics at these points. The regulator is fundamentally different from the pilot-channel type previously used with carrier systems for this purpose, in that it provides the required correction over all channels more accurately by an automatic curve-fitting process on the basis of information received from all the working carrier channels, rather than on the basis of information received from only a few transmitted pilots, and regulates on a least-squared-residual error basis using orthogonal functions. More specifically, the curve-fitting is produced by the use of four variable loss networks, which may be thermistor controlled, connected in tandem in the line output of the repeater at each regulating point, these networks being adapted to introduce a loss into the path of all the repeated carrier channels, of particular different loss-frequency shapes which are linearly independent, combinations of which very closely follow the transmission departures experienced in the line and repeaters of the system. The four linearly independent shapes may comprise, for example, those respectively represented by different ones of four terms of a Legendrian polynomial series, or of a cosine series.

The circuit for controlling these networks comprises groups of amplifiers, filters, rectifiers and computer weighting resistors in a suitable circuit arrangement operating under control of the wave energy diverted from the line at the output of the four networks to control the adjustment of each of the four networks on a least-squared-residual error basis so that the amplitude of the loss shape introduced by each is a function of the departures from normal of the integrated energy levels of the individual carrier channels at the regulating point, and such that the sum of the inserted losses of all four networks effectively compensates for the signal distortion due to the effects of extreme variations of temperature or other variable transmission conditions to which the system component elements in front of the regulating point are subjected. The main function of the control circuit is to develop an error signal current proportional to the sum of the squares of the integrated voltage deviations from normal of all of the individual carrier channels for use in providing the desired control of the amplitudes of the inserted shaping losses. A primary function of the weighting resistors in this circuit is to analyze the departures into the amount of each shape contained therein. A secondary function of the weighting resistors is to compensate for the lack of perfect mutual orthogonality (or independence, roughly speaking) of the available network structures used to approximate the desired shapes for the four regulator networks. This lack of perfect orthogonality between the several regulating shapes, if not corrected for, would tend to produce an interaction between them, so-called "hunting," which would result in unstable transmission.

A feature of the invention is a control for the four variable loss shaping networks, in which signal rectification is deferred until after the twelve component carrier signals have been mixed as A.-C. voltages in the computer (network of weighted resistors and associated summing amplifiers), allowing the use of simple, stable A.-C. amplifiers, rather than more complicated and relatively unstable D.-C. amplifiers, throughout most of the control circuitry, and enabling the number of required rectifiers to be substantially reduced.

A more thorough understanding of the various objects and features of the invention may be obtained by study of the following complete description thereof when read in conjunction with the accompanying drawings in which.

The automatic deviation regulator of the invention was specifically designed for use with a commercial Bell System, 12-channel, repeatered cable carrier system, known as the type N or N1 carrier system, which was designed for short-haul use on toll and exchange plant cables. This system, as described in the copending application of R. S. Caruthers, Serial No. 176,036, filed July 26, 1950 (United States Patent 2,695,332, issued November 23, 1954), includes two terminals and a number of intermediate repeaters spaced from 6 to 8 miles apart, interconnected by cable, and employs transmitted carrier, double sideband transmission with the twelve channels spaced at 8-kilocycle intervals. Within a single cable, directional separation is obtained by the use of two cable pairs, and, in addition, by using different frequency bands (44 to 140 kc. and 164 to 260 kc., respectively,) for the two directions of transmission. Interchange or "frogging" of west-to-east and east-to-west channel frequency allocations and inversion of the order of the channels at alternate repeaters in the line; built-in compandors in the terminals and other features described in detail in the aforementioned Caruthers application are provided to reduce cross talk and noise difficulties and enable efficient transmission of communication signals by means of carrier for relatively short distances at low cost.

In the type N1 carrier system as originally designed, only two types of automatic transmission regulators were found to be necessary to provide adequate regulation of transmission on circuits up to approximately 100 miles in length depending on the maximum outside temperature range: (1) group "flat dynamic" regulation by means of thermistor-controlled flat gain regulators in each repeater and in the receiving terminal group equipment; and (2) channel regulation by means of individual A. V. C. type regulators in the channel units at the receiving terminal to counteract dynamic transmission deviations other than "flat." The group regulation was effected by measuring the energy in the 12 carrier channels taken together as a pilot channel, and adjusting the repeater and receiving group gain so as to maintain the pilot channel output thereof substantially constant. Channel regulation was effected similarly in each channel receiving circuit, using the carrier of that channel alone as a pilot.

It was found that the flat group regulation in type N carrier is in general adequate for systems substantially longer than 100 miles; but for certain system lengths, for example, of 150 miles or more, the effects of extreme temperature variations on system components, particularly on the cable and the repeater copper oxide modulators, tended to introduce frequency characteristics which began to drive some of the channel regulators beyond their operating limits, with the result that these regulators would not provide the necessary regulation to take care of the distortion effects of such deviations. On a 100-mile system equalized at 45° F. for example, this is expected to occur when the outside temperature reaches the extremes of $-30°$ F. and $+120°$ F. When this occurs, the channels will not meet the severe service standards usually specified for them as components of a multi-line toll connection. Thus, when this system is used over routes that are longer than 150 miles, for which there is a substantial commercial demand, it becomes necessary to add some means for compensating for the effects of such temperature variations on the transmission of the system. These effects are likely to be rapid and occurring within a few hours and even minutes. It has been found that adequate compensation for these effects can be attained by the use of automatic loss deviation regulators in accordance with the invention to be described below in connection with the several figures of the drawings.

Figure 1:
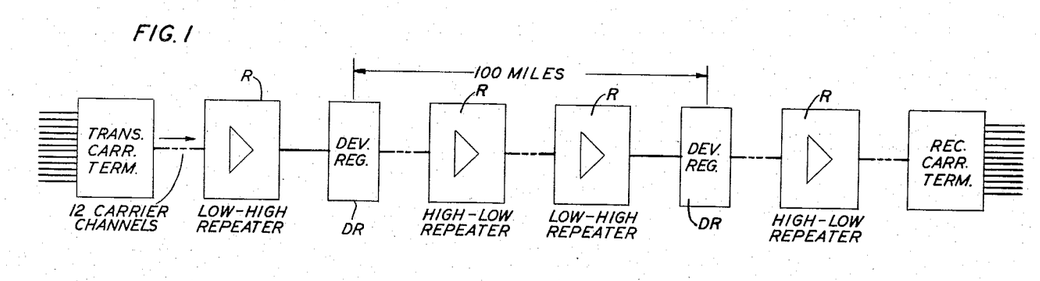
Fig. 1 is a block diagram of a portion of one commercial type of multi-channel, repeatered carrier wave signal transmission system showing where the deviation regulators in accordance with the invention would be applied.
Figure 2A:
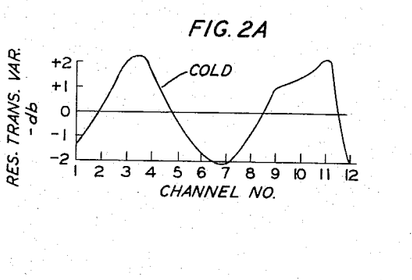
Figs. 2A to D show curves respectively indicating the departures from normal of the transmission variations which would occur in the several channels of one section of a commercial multi-channel carrier system when subjected to extreme temperature conditions, and the reduction of such variations to bring them within tolerable limits which could be attained by the use of a suitably designed regulating system in connection with that section.
Figure 2B:
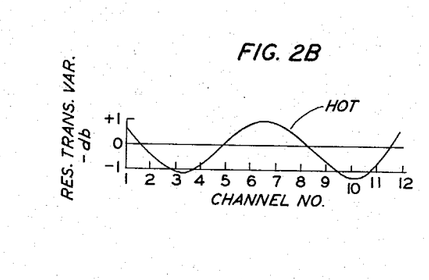
Figure 2C:
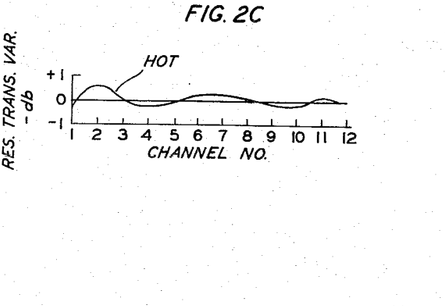
Figure 2D:
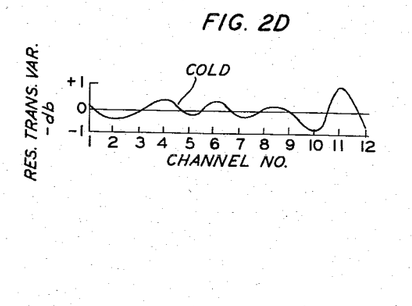

Fig. 1 is a block diagram of the west-to-east transmission portion of a repeatered, broad-band carrier signaling system, such as the type N 12-channel, cable carrier telephone system described briefly above, including a transmitting and a receiving carrier terminal station so labeled and a plurality of intermediate repeater stations R interconnected by cable at, say, 6 to 8 mile intervals. As shown, alternate ones of the repeaters R are of the low-high and high-low frequency interchange type described in the aforesaid copending Caruthers patent application, as indicated by the descriptive labels. Preferably, as shown, a loss deviation regulator DR in accordance with the invention would be associated with the line directly following the output of certain of the repeaters R, restricted to low-high repeaters for certain practical reasons, spaced at, say, about 100-mile intervals when it is to be expected that the preceding line and repeaters will be subjected at certain times, to extreme temperature deviation in the range from $-30°$ F. to $+120°$ F., or at selected longer intervals when it is to be expected that these components will be subjected to less extreme temperatures. As each of the regulators employs a number of vacuum tubes, it is preferably associated with a repeater at a power supply point. Other deviation regulators (not shown) would be used at corresponding repeater points for the east-to-west direction of transmission.

The curves of Fig. 2 were plotted from test data taken on a 272-mile section of the 12-channel type N carrier system. The upper two curves (A) and (B) respectively show the residual transmission variation (departures from normal value at 85° F. which is considered a representative ambient temperature condition) in decibels at repeater points spaced from each other by 100-mile intervals, plotted as a function of channel number, when the preceding repeater section and line is subjected to a temperature swing of 100° F. from cold to hot, assumed to be 50° F. below and above, respectively, the system line-up temperature, when no automatic deviation regulator is used. The lower curves, (C) and (D), are compromise curves obtained by calculations using available data, which show the tolerable transmission residual variations as a function of channel number for the same repeater section subjected to the same hot and cold temperature conditions, which could be obtained by the use of a properly designed transmission regulator associated with that section of the system. The deviation regulators of the invention to be described provide a correction within the limits indicated by curves (C) and (D) of Fig. 2.

Figure 4A:
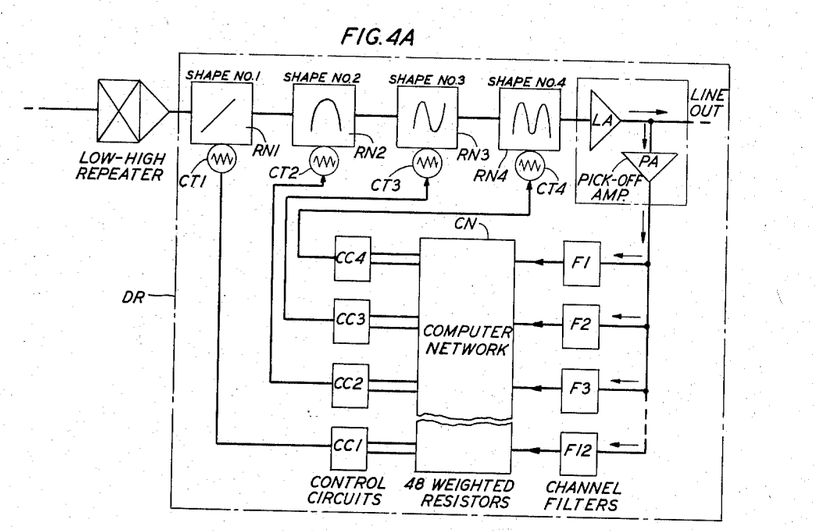
Figs. 4A and 4B respectively show schematically the circuit arrangement of one embodiment of a deviation regulator which could be used in the boxes so labeled in the carrier system of Fig. 1 to accomplish the purposes of the invention, and a detail of that arrangement.
Figure 4B:
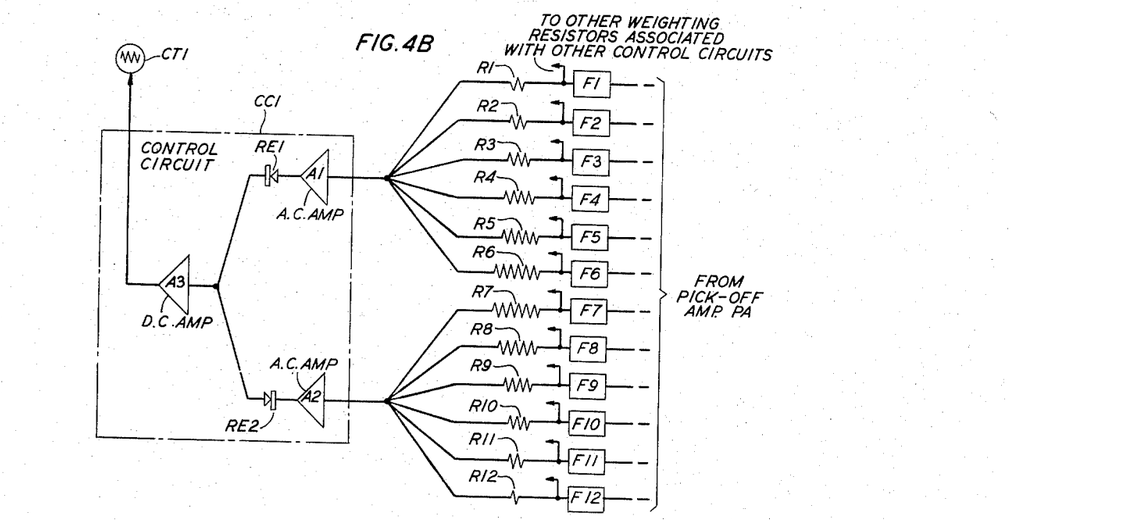

In the embodiment of the invention illustrated in Figs. 4A and 4B, the deviation regulator DR as shown within the dash-line box so labeled, includes four thermistor-controlled, variable loss networks, represented by the boxes designated RN1, RN2, RN3 and RN4, respectively, which are connected in tandem in the line output of the low-high repeater R at the regulating point, and thus in the common path of the twelve carrier channels repeated by that repeater. As indicated by the characteristic curve shown within each of the boxes RN1, RN2, RN3, and RN4, the loss shape No. 1 introduced into the line by network RN1 is a straight line slope, that introduced into the line by network RN2 is of parabolic or "bulge" form; and those introduced into the line by networks RN3 and RN4 are both "sinuous" in form and may be defined as cubic and quartic, respectively. These shapes are terms of a series chosen to best match system changes encountered in the preceding repeater section, as determined by transmission measurements on the line (cable) and repeater. It happens that in the N1 carrier application the slope and bulge shapes are basically required to compensate for cable changes, and the cubic and quartic shapes to compensate principally for repeater changes.

Figure 3:
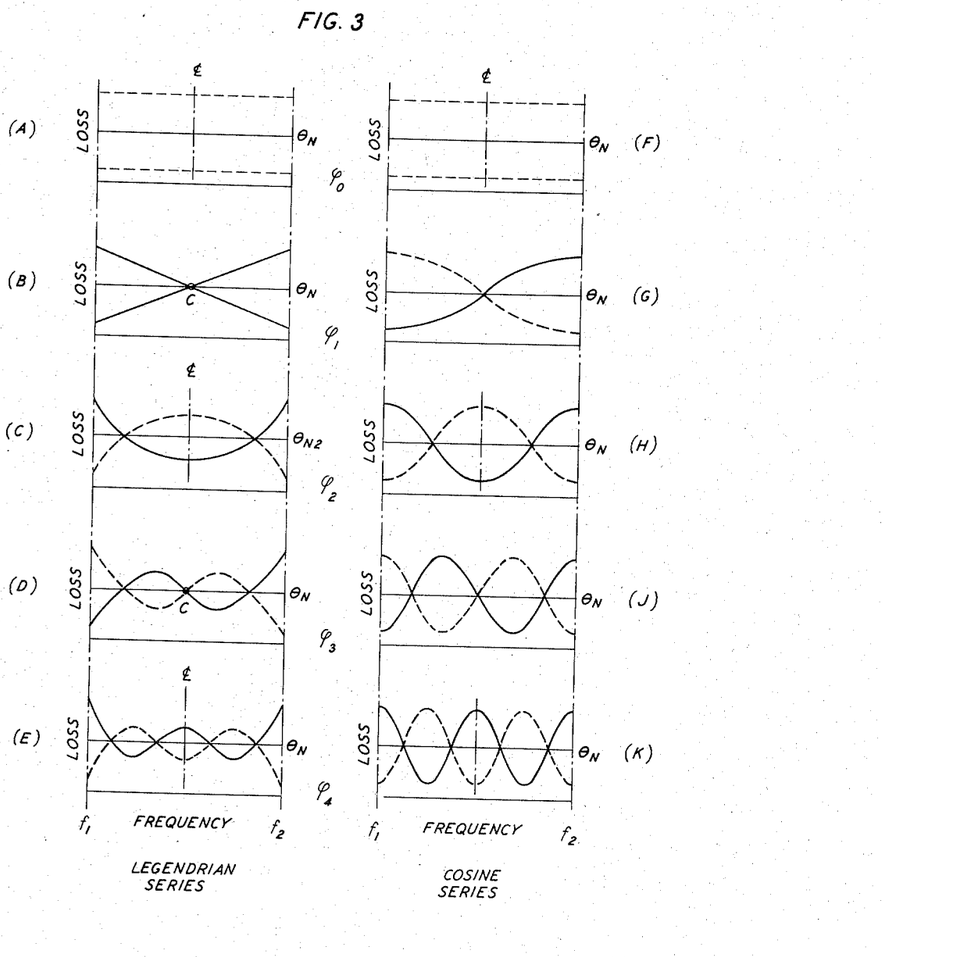
Fig. 3 shows curves representing the well-known Legendrian family of orthogonal functions and the cosine approximations thereof, which may be made use of in designing the variable loss regulating networks in the deviation regulator of the invention.

The linearly independent shapes required in the deviation regulator DR may belong to one of the many families of orthogonal curves, for example of the shapes represented by a plurality of terms of an orthogonal set of functions, such as the well-known Legendrian polynomial series, shown by the curves of (A), (B), (C), (D) and (E), respectively, of Fig. 3 or the cosine approximations thereof shown by the curves F, G, H, J and K, respectively, of Fig. 3. These two families of curves have the following characteristics in common:

(a) They will fit "in the best possible manner" a requirement curve, each additional shape of this family improving the fit. This "best possible manner" should be understood in a restricted sense. In this discussion, the best fit is a "least squares" fit;

(b) The contribution required of each shape towards this fit is independent of the contribution of all other shapes belonging to the same family.

Practical considerations have indicated that the best fit for the N1 carrier application would be obtained by the use of the slope and bulge shapes approximately represented by the two terms of a Legendrian series, illustrated by the curves (B) and (C) in Fig. 3, or the cosine approximations of these curves illustrated at (G) and (H) in Fig. 3, in the networks RN1 and RN2, respectively; and by the use of the cubic and quartic shapes represented by the third harmonic and fourth harmonic terms, respectively, of the Legendrian series, illustrated by the curves (D) and (E) of Fig. 3, or the cosine approximations thereof illustrated by the curves (J) and (K) of Fig. 3, in the networks RN3 and RN4, respectively. The realization of the "flat" shape represented by the first term of the Legendrian or of the cosine series, shown at (A) and (F), respectively, in Fig. 3, does not require the use of a separate network providing this shape, as it may be obtained readily merely by proper design of the gain regulation characteristic of the variable gain amplifier in the low-high repeater R preceding the deviation regulator. Each of the networks RN1 to RN4 is adapted to be continuously variable under control of an associated thermistor CT1 to CT4, respectively, when its resistance is varied.

The deviation regulator DR also includes an A.-C. amplifier LA connected in the portion of the line immediately following the last network RN4, having a gain characteristic such as to make up for the flat loss introduced into the line by the four networks RN1 to RN4, and thus to compensate for the resultant flat loss produced in the twelve carrier channels before they are passed to the outgoing line leading to the next intermediate repeater R, and to the input of the backward-acting control for the thermistors of the four networks RN1 to RN4.

In the embodiment of the deviation regulator shown in Fig. 4A, the backward-acting control for the thermistors of the networks RN1 to RN4 includes: (1) a pick-off amplifier PA having its input connected across the line in the output of LA; (2) a group of twelve channel filters F1 to F12 respectively adapted to select the carrier and sidebands of a different one of the twelve carrier channels from the energy supplied thereto, having their inputs connected in parallel across the output of PA; (3) a computer network represented in Fig. 4A by the box designated CN, including 48 weighted resistors divided into four groups of twelve resistors each, designated R1 to R12, R13 to R24, R25 to R36 and R37 to R48, respectively, one resistor in each group being provided for each of the twelve channel carriers; and (4) four control circuits CC1 to CC4 respectively connected between the resistors of a different one of the four groups and different ones of the four control thermistors CT1 to CT4 associated with the regulating networks RN1, RN2, RN3 and RN4, respectively. As shown in Fig. 4B, for the control of network RN1 providing the slope shape, the twelve computer resistors in each group associated with the control circuits CC1 to CC4, respectively, are split into two sets comprising six (+) resistors, respectively connected in the output of a different one of the six filters F1 to F6 for respectively selecting the six lower frequency channel carriers and six (−) resistors, respectively connected in the output of a different one of the six channel filters F7 to F12 for respectively selecting a different one of the six higher frequency channel carriers, the signs (+) and (−) referring to the ultimate polarities of the resulting voltages when they are rectified in the associated control circuits CC1 to CC4.

The weighting factors for the two sets of weighting resistors in the computer network portion associated with each of the control circuits CC1 to CC4 are related to the corresponding regulating shapes. Theoretically, they are inversely proportional to the normalized value of each of the orthogonal functions representing these shapes at the twelve carrier frequency points. Since these values are either positive or negative, as shown, the outputs of the weighted resistors in the respective groups of resistors respectively connect either to a common positive or a common negative polarity point in the control circuit with which they are associated. Thus, in the control for the network RN1 providing a straight line slope shape, as shown in Fig. 4B, the group of six (+) weighted resistors R1 to R6 in the output of filters F1 to F6, respectively, are connected to a common positive point in the input of the A.-C. amplifier A1 in the control circuit CC1 and the other six (−) computer resistors R7 to R12 in the respective outputs of the higher frequency channel filters F7 to F12 are connected to a common negative point in the input of the other A.-C. amplifier A2 in the control circuit CC1. The functions representing the several shapes are of such nature that the sum of the values of each function as taken at the twelve carrier frequency points is zero, and hence, the sum of the weighted resistances with corresponding polarity signs is also zero. This follows from the fact that the shapes must be orthogonal to a flat loss.

The relative resistance value of each of the twelve computer resistors associated with each of the four control channels CC1 to CC4, is chosen so that the relative transmission losses of each of the twelve L-pads consisting of one resistor as the series element and the total resistance to which it is connected at the control circuit end match the normalized network weighting factors for the particular network shape without regard to signs, each resistor being connected at one end to the filter selecting the channel corresponding to the weighting particular factor, and at the other end to one of the two inputs of the control circuit for the control channel involved, the terminal (+ or −) being chosen according to the sign of the particular weighting factor.

The absolute resistance values are selected so as to yield a reasonable signal loss through the computer. If the resistances are chosen to have large resistance values compared to the control circuit input resistance, the design problem is considerably eased because the required value of each resistance becomes practically independent of the values of all the other resistances. This results in signal losses in the computer higher than the minimum possible, but in the N1 carrier application the extra gain required of the control circuit was not great enough to complicate the control circuit.

The network weighting factors mentioned above would be altered by the network designer to take account of the imperfect orthogonality among the networks.

As indicated for the control circuit CC1 for the slope network RN1 in Fig. 4B, each of the control circuits CC1 to CC4 for networks RN1 to RN4, respectively, includes two oppositely poled rectifiers RE1 and RE2, which may be of the varistor type as shown, which are respectively connected on one side to the output of the A.-C. amplifier A1 and to the output of the A.-C. amplifier A2 in this circuit, and a single stage of D.-C. amplification A3 to the input of which the other sides of the two rectifiers RE1 and RE2 are connected in series, the output of the D.-C. amplifier A3 being connected to the thermistor CT1, CT2, CT3 or CT4 of the particular one of the regulator networks RN1 to RN4, respectively, which it controls so as to supply heating current to that thermistor.

Figure 5A:
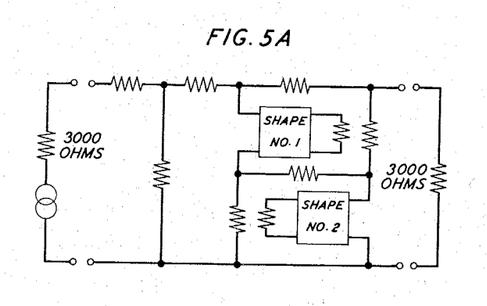
Figs. 5A and 6A and 5B and 6B, respectively, show schematically the basic circuit arrangements of two known types of variable equalizer network structures and the frequency-loss characteristics thereof, which may be used to realize the particular linearly independent loss shapes required in the four regulating networks of the embodiment of the deviation regulator of the invention shown in Fig. 4A.

The operation of the deviation regulator of Fig. 5A can be better understood by considering the action of the portion controlling the network RN1 providing the slope shape, with reference to Fig. 4B.

The wave energy of the twelve carrier channels in the output of the pick-off amplifier PA are impressed on the twelve channel filters F1 to F12 which respectively select from the impressed wave the carrier signals (sidebands and carrier) of a different one of the twelve carrier channels. The energy output of the six lower frequency channel filters F1 to F6 are respectively passed through a different one of the weighted resistors R1 to R6 and are combined in the input of the "summing" A.-C. amplifier A1 in the control circuit CC1, are amplified by that amplifier and are impressed on the rectifier RE1. Similarly, the wave energies in the outputs of the six higher frequency channel filters F7 to F12 are respectively passed through a different one of the weighted resistors R7 to R12 and are combined in the input of the other "summing" A.-C. amplifier A2 in the control circuit CC1, are amplified in that amplifier and are impressed on the rectifier RE2. The first rectifier RE1 is poled so as to produce a positive D.-C. voltage from the applied waves, and the second rectifier RE2 is poled so as to produce a negative A.-C. voltage from the applied waves.

The resulting (+) and (—) voltages in the outputs of the rectifier RE1 and RE2, respectively, are then summed in the input of the D.-C. amplifier A3 to develop a net voltage $e$. For normal variation of the slope components of the line distortion at the output of the deviation regulator, $e$ would be nominally zero, that is, preferably, it would have a low negative value, say, —2 volts, equal to the mid-range bias for the D.-C. amplifier stage A3, in order that the resulting amplified current in the output of amplifier A3 which is transmitted through the thermistor CT1 for network RN1, will always be sufficient to sustain the thermistor current at a given nominal value. This may be obtained, for example, by a suitable relative adjustment of the gains of the two A.-C. amplifiers A1 and A2. For this condition, the network RN1 will not insert any slope correction in the line.

For any change in slope at the wave inputs to the channel filters F1 to F12, the resulting departure of $e$ from its nominal value will cause the heating current supplied to the thermistor CT1 controlling the regulating network RN1 to vary proportionally the resistance value of that thermistor so that the regulating network RN1 will insert its loss shape into the line at a definite amplitude, proportional to the weighted and integrated change in levels of the twelve carrier channels at the output of the deviation regulator, which is the contribution of this particular shape toward the correction of the signal distortion.

The similar operation of the other control circuits CC2, CC3, and CC4 under control of the waves in the outputs of the twelve channel filters F1 to F12, will cause the adjustment of the regulating networks RN2, RN3, and RN4, respectively, to insert the bulge, cubic and quartic shapes, respectively, into the line each at an amplitude proportional to the weighted and integrated level of the twelve carrier channels at the output of the deviation regulator, which are the contributions of these particular shapes toward the correction of the signal distortion.

Figure 6A:
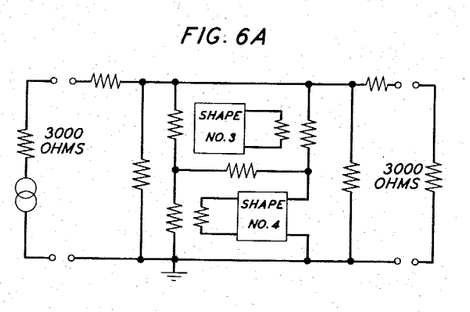

The slope (#1) shape required in the regulating network RN1 and the bulge (#2) shape required in the regulating network RN2 in the embodiments of the invention illustrated in Figs. 4A and 4B of the drawings, may be both approximately realized in a single network of the general type show schematically in Fig. 5A of the drawings. Similarly the cubic (#3) shape required in the regulating network RN3 and the quartic (#4) shape required in the regulating network RN4 in the embodiment of the invention illustrated in Figs. 4A and 4B, may be both approximately realized in the single network of the general type shown schematically in Fig. 6A of the drawing. The networks of Figs. 5A and 6A are both of the general double regulator type shown in Fig. 10 of the U. S. patent to S. Darlington, No. 2,362,359 issued November 7, 1944. The configuration of the structure is such that the two regulators represented by the boxes labeled shapes #1 or #2, in Fig. 5A, or shapes #3 and #4 in Fig. 6A, are isolated from each other by a condition equivalent to an attenuator pad; its outstanding feature is that this loss padding required to maintain a given isolation between the two regulator networks providing the #1 and #2 shapes, or the #3 and #4 shapes, in the boxes so labeled in Figs. 5A and 6A, respectively, is less than that of an attenuator used in the conventional way, that is, inserted between the two regulator networks in tandem. The design formulae for these networks are given in the aforementioned Darlington patent.

Figure 5B:
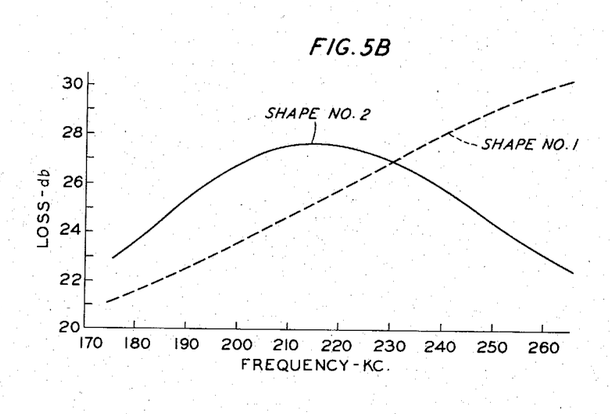
Figure 6B:
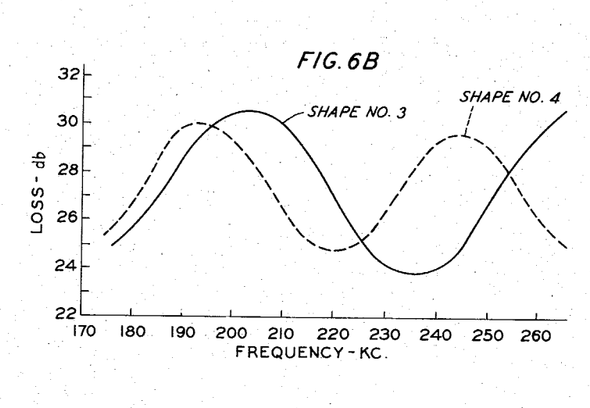
Figure 7:
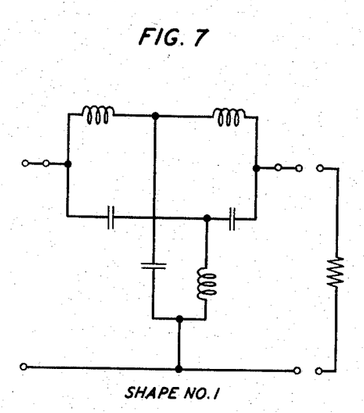
Figs. 7 to 10 respectively show particular circuit arrangements which could be used in the boxes representing the shaping network components in the basic equalizing network structures of Fig. 5A or 6A to realize the different shapes required for the four regulating networks in the embodiments of the deviation regulator of the invention shown in Fig. 4A.
Figure 8:
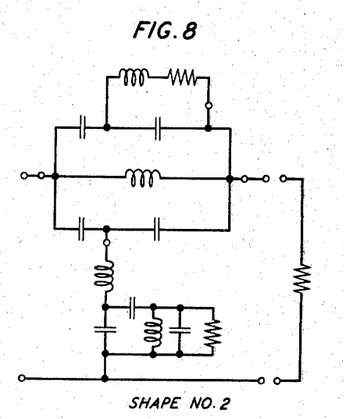

In the network of Fig. 5A, the regulator portion providing the #1 and #2 shapes is represented merely by boxes so labeled. The loss-frequency characteristic to be attained by the #1 and #2 shaping portions are shown by the dash-line and solid curves, respectively in Fig. 5B. The schematic circuits of network portions which may be used to realize the #1 and #2 shapes in the boxes so labeled in Fig. 5A are shown in Fig. 7 and Fig. 8, respectively. Similarly, the loss-frequency characteristics to be attained by the #3 and #4 shaping portions of the network of Fig. 6A, represented therein only by boxes so labeled, are shown by the solid and dash-line curves, respectively, of Fig. 6B. The schematic circuits of the network portions which may be used to provide the #3 and #4 shapes in the boxes so labeled in the network of Fig. 6A are shown in Figs. 9 and 10, respectively of the drawings.

Figure 9:
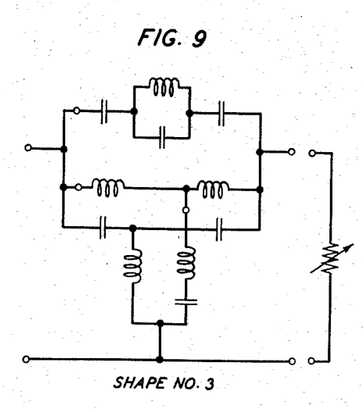
Figure 10:
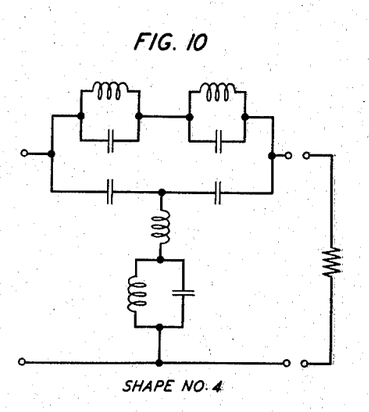

Each of the networks shown in Figs. 7 to 10 is an adjustable attenuation equalizer of the general type shown in Fig. 15 of the U. S. Patent to Bode, 2,096,027, issued October 19, 1937, comprising a shunt impedance which includes a shaping network terminated in an adjustable resistor. The shaping network components for the four attenuation equalizers shown in Figs. 7 to 10, respectively, are different. The circuit of the network for providing shape #1 (straight line with adjustable slope) shown in Fig. 7, is an unbalanced parallel-T, constant resistance all-pass structure of the type disclosed in the U. S. patent to Kingsbury, No. 2,567,380, issued September 11, 1951. The circuit of the shaping network for providing shape #2 (bulge) as shown in Fig. 8, is a constant resistance, all-pass structure with dissipative impedance branches added to provide, over the operating range, a parabolic deviation characteristic, of the type disclosed in the copending U. S. patent application of S. Bobis, Serial No. 394,663, filed November 27, 1953 (United States Patent 2,792,552, issued May 14, 1957), which is also built as an unbalanced bridged-T structure. The circuit of the shaping network for providing shape #3 (cubic), as shown in Fig. 9, is a constant resistance all-pass structure built as a bridged-T structure comprising two parallel T's and a bridging branch. The circuit of the shaping network for providing shape #4 (quartic), as shown in Fig. 10, is a constant resistance, all-pass structure, built as an ordinary unbalanced bridged-T structure. The structures for providing the #1 and #2 shapes shown in Figs. 7 and 8, respectively, approximate closely the Legendrian functions illustrated by the curves (B) and (C), respectively, of Fig. 3, whereas the structures for providing the #3 and #4 shapes shown in Figs. 9 and 10, respectively, more closely approximate the cosine functions illustrated in curves (J) and (K) of Fig. 3.

*Orthogonality—significance*

As mentioned before, the described deviation regulator is inherently free from interaction between shapes; a pure slope error, for example, will not incite any network other than that (RN1) providing the slope shape to put in a correction. Thus the four networks RN1 to RN4 will not hunt back and forth while each one modifies the amount of correction required by the others. This freedom from interaction is due to the mutual orthogonality of the network shapes, which may be expressed mathematically as follows: Two functions $\phi_m$ and $\phi_n$ of a variable $x$ (two of the network shapes, functions of frequency) are said to be orthogonal if $$\int_x \varphi_m \varphi_n = 0, \quad m \neq n$$
$$\phantom{\int_x \varphi_m \varphi_n} = \text{constant}, \quad m = n \qquad (1)$$

It is this property that permits a solution for the constants in a Fourier series approximation to a curve, for example. A unique constant for each term results from analysis of the curve to be fitted, regardless of how many or how few terms are used in the approximation. Although Legendrian polynomials are used in the regulator, a feeling for the property of orthogonality may be obtained by pursuing the familiar Fourier series fitting of a curve as an example of the use of orthogonal functions.

Figure 11A:
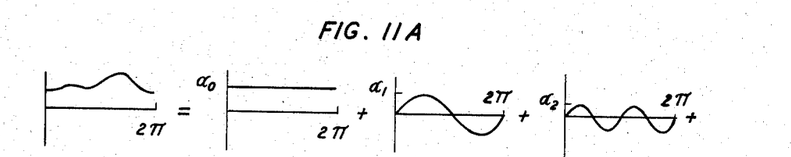
Figs. 11A to D respectively show diagrams used in connection with a description of the mechanism and theory of regulator curve-fitting provided by the deviation regulators of the invention.

Assume a function $f(x)$ is to be fitted with a Fourier series over a range of $x$ from zero to some positive value. This is expressed as $$f(x) = a_0 + a_1 \sin x + a_2 \sin 2x + \ldots \qquad (2)$$

where the number of terms used is determined by the desired closeness of fit. This equation is pictured in Fig. 11A. Although the $f(x)$ curve resulting from the above approximation must be periodic with odd symmetry about the origin, the fit is good within the chosen region of fit. Components outside this region are ignored.

The amount of $\sin x$ needed is obtained by multiplying both sides of Equation 2 by $\sin x$ and integrating from 0 to $2\pi$ (the region of fit):

$$\int_0^{2\pi} f(x) \sin x \, dx = \int_0^{2\pi} a_0 \sin x \, dx + \int_0^{2\pi} a_1 \sin^2 x \, dx +$$
$$\int_0^{2\pi} a_2 \sin x \sin 2x \, dx + \ldots \qquad (3)$$

Figure 11B:
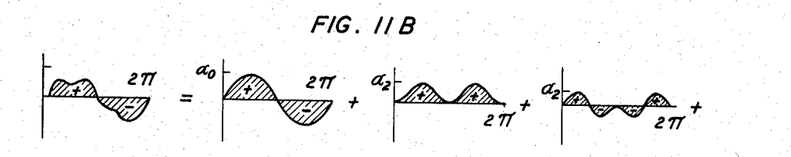

Fig. 11B is a pictorial representation of this equation. It states in effect that the total areas (integrals) on both sides of the equation are equal. Note that all of the areas on the right side are zero except the second one. Equation 3 may therefore be rewritten:

$$\int_0^{2\pi} f(x) \sin x \, dx = \int_0^{2\pi} a_1 \sin^2 x \, dx \qquad (4)$$

Inspection of the pictorial representation in Fig. 11B shows that the area represented by the right side of Equation 4 is $a_1 2\pi/2$, or $a_1 \pi$. Equation 4 therefore becomes $$\int_0^{2\pi} f(x) \sin x \, dx = a_1 \pi \qquad (5)$$

This can be solved for $a_1$ which is the amount of $\sin x$ needed in Equation 2:

$$a_1 = \frac{1}{\pi} \int_0^{2\pi} f(x) \sin x \, dx \qquad (6)$$

Of course, Equation 6 may be used directly without going through the derivation or drawing any pictures, but the intention here is to show the mechanism by which orthogonality permits solving for a unique amount of each shape in a series approximation to a curve. The orthogonal property of the terms in the Fourier series, which is expressed in Equation 1, has led to a definite value for the amount ($a_1$) of sine shape by causing all the terms but one to drop out of Equation 3. If the series had not been orthogonal it would have been impossible to solve for $a_1$, since the latter would have depended on $a_2$, $a_3$, etc. There would have been a number of solutions instead of just one. Consequently, if one shape were changed, a curve-fitting device (the regulator) would change all the others and hunt for a new solution, possibly never stabilizing.

The Fourier series was chosen for the above illustration as the most familiar orthogonal series. The shapes actually used in the regulator are based on terms of a Legendrian polynomial series or of a cosine series, which also have the property of orthogonality. The first term in this series has a slope shape, and the second is similar to bulge. These are the major components in the temperature-dependent characteristic to be equalized.

To review the procedure used to solve for the amount of a particular shape required, the steps are to (1) Multiply the curve to be fitted by the shape in question.

(2) Integrate over the range of fit.

(3) Multiply by a constant.

Figure 11C:
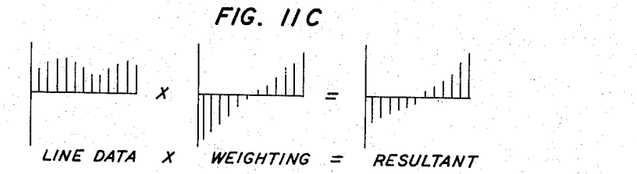
Figure 11D:
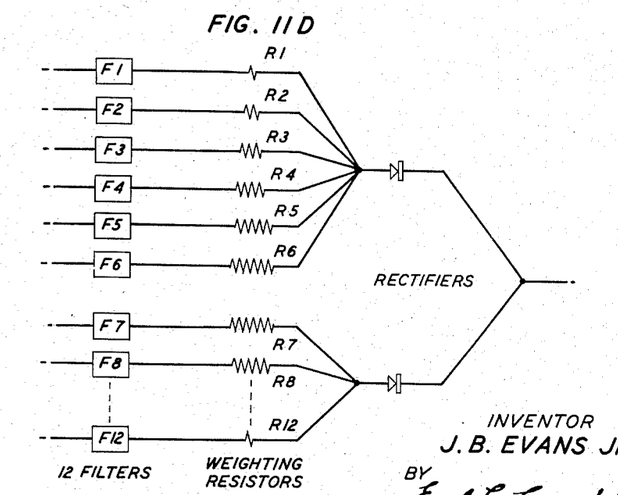

The orthogonal regulator of the invention does just this, but on a discrete rather than a continuous basis, as shown in Fig. 11(C) and (D). It multiplies the line data, frequency by frequency, by the shape to be used (the first shape, slope, is taken as an example) by passing the energy from the twelve filters in the network control (see Figs. 4A and 4B) through the rectifiers and associated weighting resistors. It adds the twelve resulting voltages (integration, on a discrete basis). It does not then multiply the resultant by any particular constant, but still arrives at a new error voltage $e$ proportional to the required amount of shape. The function of the control circuit (CC1, CC2, CC3, or CC4) is to cause the associated network (RN1, RN2, RN3 or RN4) to introduce the desired corrective loss shape (for example, slope) in increasing amount until the net error voltage is reduced (ideally) to zero. These shapes may approximate those represented by the second and third terms, respectively, of a Legendrian polynomial series, as shown in curves (B) and (C) of Fig. 3 or by the second and third terms of a cosine series, as shown in curves G and H of Fig. 3. The cubic and quartic shapes required in the characteristic to be corrected may be those represented by the fourth and fifth terms of the Legendrian polynomial series, shown by the curves (D) and (E) of Fig. 3, or of the corresponding terms of the cosine series. The networks found most satisfactory for realizing those required shapes approximately in the regulating networks RN1 to RN4 of Fig. 4A, are those illustrated in Figs. 5A, 6A and 7 to 10, as described above. The flat shape required in the characteristic to be corrected represented by the first term of the Legendrian polynomial series as pointed out above, in the type N carrier system, did not necessitate the use of a fifth network giving the shape, as it was readily obtained by suitable adjustment of the gain of the variable gain amplifier in the preceding low-high repeater N, by the associated thermistor control.

The property of othogonality in the case of twelve discrete frequencies, as in the type N carrier application, is expressed $$\sum_{\text{ch. 1-12}} W_m W_n = 0, \quad m \neq n$$
$$= \text{constant}, \quad m = n \quad (7)$$

where $W_m$ and $W_n$ are the weighting factors representing the shapes of networks $m$ and $n$.

Figure 12:
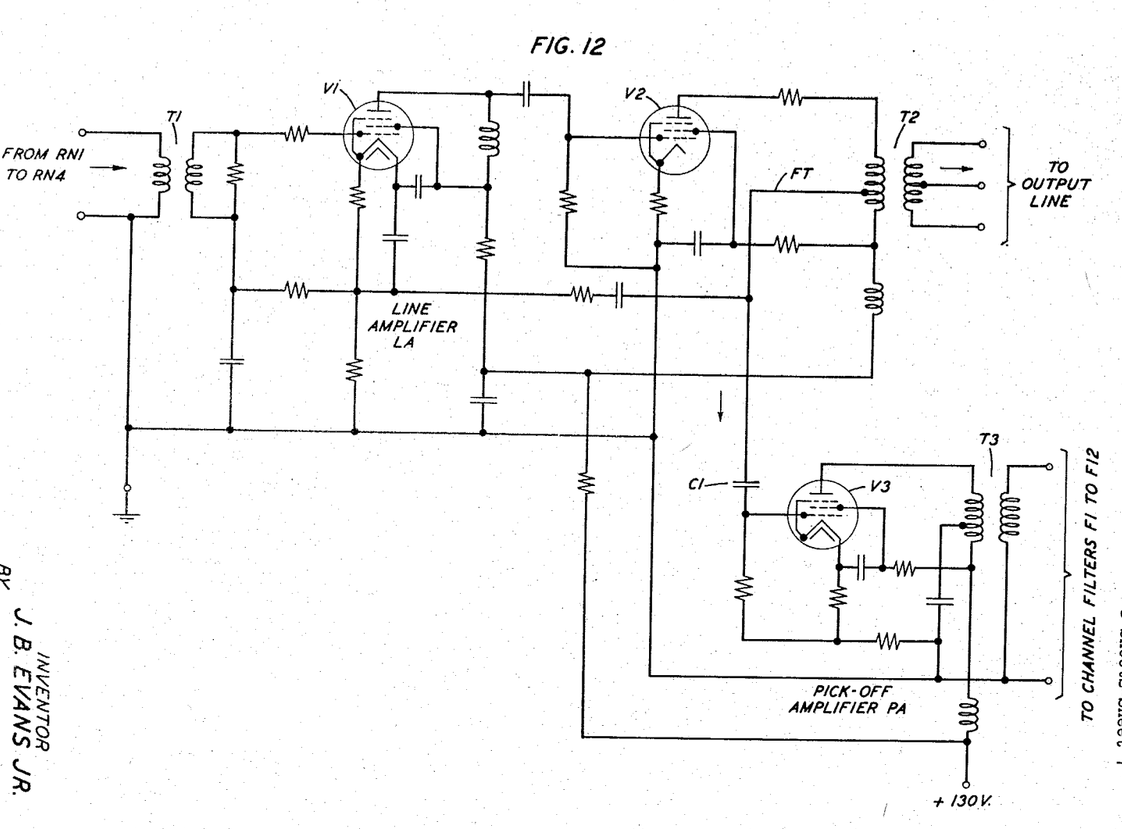
Figs. 12 and 13 respectively show circuit arrangements which could be used for the amplifiers LA and PA and the amplifier-rectifier arrangements in each of the control circuits CC1 to CC4, respectively, in the deviation regulator of the invention shown in Figs. 4A and 4B.
Figure 13:
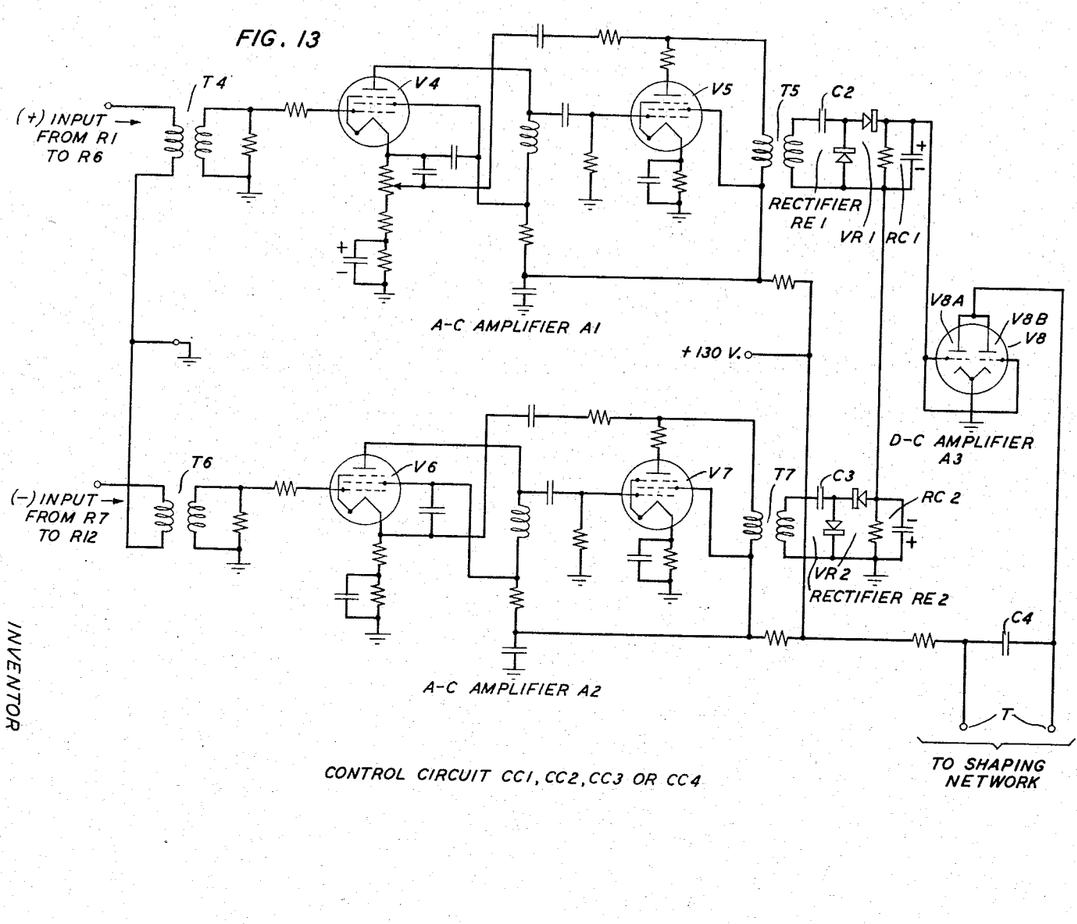

In the deviation regulator in accordance with the invention, which was constructed and found to be adequate for the required purposes, the circuit schematics of the amplifier circuits including the line amplifier LA and the pick-off amplifier PA, and of each of the control circuits CC1 to CC4, are shown in Figs. 12 and 13, respectively.

As shown in Fig. 12, the amplifier LA comprises two pentode tube stages V1 and V2 connected in tandem between the input transformer T1 (which is fed from the line in the output of the four regulating networks RN1 to RN4 in the repeater output) and the output transformer T2 (which feeds the output line leading to the next repeater). The pick-off amplifier PA comprises a single pentode amplifying tube V3 and an output transformer T3 for that tube, which connects in parallel to the inputs of filters F1 to F12 in the regulator control (as shown in Figs. 4A and 4B of the drawings). A portion of the waves in the output of LA is fed through the feedback tap FT on the primary of the output transformer T2, and the series capacitor C1 to the control grid circuit of the pentode V3. The feedback on the pick-off tube V3 is adjusted by proper selection of the values of the resistors, condensers and other elements associated with that tube and with the output of tube V2 of amplifier LA, so that the outputs of these tubes are equal. This loads both of these tubes to maximum capability and provides the energy necessary to activate the regulator control fed by output transformer T3 without disturbing the normal conditions on the line fed by output transformer T2.

As shown in Fig. 13, each of the control circuits CC1 to CC4 includes two A.-C. amplifiers A1 and A2. The amplifier A1 comprises two pentode stages V4 and V5 connected in tandem between an input transformer T4 and an output transformer T5. The A.-C. amplifier A2 comprises two pentode stages V6 and V7 which are connected in tandem between an input transformer T6 and and output transformer T7. The input transformer T4 of amplifier A1 is fed with the combined waves in the output of the weighting resistors R1 to R6, and the input transformer T6 of amplifier A2 is fed with the combined waves in the output of the weighting resistors R7 to R12 in the regulator control (as shown in Fig. 4B).

Each of the control circuits CC1 to CC4, as shown in Fig. 13, also includes a rectifier RE1 of the voltage doubler type including series and shunt varistors VR1 poled as indicated, and a resistance-condenser filter RC1; a second rectifier RE2 of the same type but in which the series and shunt varistors VR2, are oppositely poled with respect to the varistors VR1 of the rectifier RE1, and a second resistance-condenser filter RC2; and a D.-C. amplifier A3 consisting of two three-electrode amplifying portions V8A and V8B having their grids and plates, respectively connected in parallel, in a common envelope V8. The input of rectifier RE1 is connected through the series capacitor C2 and the output transformer T5 to the output of the A.-C. amplifier A1, and the input of the rectifier RE2 is connected through the series capacitor C3 and the output transformer T7 to the output of the A.-C. amplifier A2. The resistance condenser filter RC1 of rectifier RE1 and the resistance-condenser filter RC2 of rectifier RE2 are connected in series with each other in the common portion of the grid-cathode circuits of the D.-C. amplifier portions V8A and V8B of the D.-C. amplifier A3, and the terminals T across which the thermistor or other control element of the associated one of the four regulator networks RN1 to RN4 are adapted to be connected, are connected across a capacitor C4 in series with the common portion of the anode-cathode circuits of the two D.-C. amplifier portions V8A and V8B of the D.-C. amplifier A3.

In the operation of the control circuit of Fig. 13, the combined waves in the output of the weighting resistors R1 to R6, applied to the input transformer T4 will be amplified in the A.-C. amplifier A1 and rectified in the associated rectifier RE1. Similarly, the combined waves in the output of the weighting resistance R7 to R12 applied to the input transformer T6 will be amplified in the A.-C. amplifier A2 and rectified in the rectifier RE2. Because of the opposite poling of the varistors in the rectifier RE1 with respect to the varistors in the rectifier RE2, a positive D.-C. voltage will be produced in the output of one of these rectifiers and a negative D.-C. voltage in the output of the other rectifiers, and these voltages will be applied in opposition to the control grid circuits of the portions V8A and V8B of D.-C. amplifier A3. As explained previously in connection with Figs. 4A and 4B, the resulting D.-C. error voltage produced in the input to the D.-C. amplifier A3 will not cause any adjustment of the associated regulating network when the departures of the levels of all carrier channels at the regulating point are within normal limits, but when the departures are outside these limits, the resulting D.-C. error voltage will cause the heating current supplied to the thermistor or other control element of the associated regulating network to be increased or decreased sufficiently to change the amplitude of the loss inserted thereby so as to compensate for the distortion introduced in that shape by the effects of the extreme temperature changes or other factors on the components of the system in the preceding section of the system.

Although the deviation regulators in accordance with the invention as described above, employ only four equalizer networks respectively providing different linearly independent shapes which have been found sufficient to provide satisfactory correction for transmission variations in the 12-channel, type N or N1 carrier system, it is within the scope of the invention to employ up to twelve of such networks for this purpose with this and similar systems and a correspondingly larger number for carrier systems having more than twelve channels, one for each of the carrier frequencies, and a corresponding number of controls, and thus to obtain even more precise compensation for transmission variations due to extreme temperatures and other unpredictable conditions. Other changes in the system described and illustrated which are within the spirit and scope of the invention, will occur to persons skilled in the art.

What is claimed is:

1. In a multichannel carrier signal transmission system in which the carriers as well as the sidebands are transmitted including a signal transmission line and repeaters at spaced points therealong, a deviation regulator for use at at least one repeater point in the system for substantially compensating for undesired variations in the transmitted carrier signals caused by the effects of extreme temperatures and other unpredictable transmission conditions on the line and repeaters in a preceding section of the system, said regulator comprising a plurality of variable loss networks connected in a common path for the signals of all the carrier channels at that repeater point, said networks being respectively adapted to insert losses of different linearly independent loss-frequency shapes into that path and means for continuously adjusting said networks to control the amplitudes of the losses inserted thereby on a least-squared-residual error basis, including a plurality of channel filters for respectively selecting the different component carrier signals of said carrier channels from the composite wave in the output of said common path, a plurality of resistors of selected weighted values, a plurality of control circuits, one for each of said networks, means for cross-connecting the outputs of each of said filters to the input of each of said control circuits through different sets of said weighted resistors, means in each control circuit for first amplifying the waves supplied thereto from said filters through the weighted resistors as alternating voltages, rectifying the amplified waves so as to produce a positive and a negative direct voltage and combining the resulting voltages to produce an error signal direct current, the weighting factors of the resistors in each of said sets being such that the amount of error signal current produced in each control circuit is proportional to the sum of the squares of the integrated and weighted departures from normal of the levels of all the carrier channels at the output of said common path, and means to apply the error signal current produced by each of said control circuits with the necessary amount of amplification to different ones of the said networks to control the amplitude of the loss produced thereby, so that the sum of the losses of all networks produces the desired compensation for said undesired transmission variation.

2. In combination with a multichannel carrier signal transmission system including a signal transmission line and repeaters at spaced points therealong for amplifying the transmitted carrier signals, means for automatically compensating for undesired variations in signal transmission over the system due to the effects on the system components of extreme temperatures and other unpredictable variable transmission conditions, said means comprising a deviation regulator at at least one regulating repeater point consisting of a plurality of variable loss networks connected in a common transmission path for the signals of all the carrier channels at the regulating repeater point, respectively adapted to introduce into the path corrective losses of different linearly independent loss-frequency shapes, and means for continuously adjusting said networks to properly control the amplitudes of the inserted losses, comprising filtering means for respectively selecting energy portions of the different component carrier signals from the composite wave including all the carrier channels, in the output of said common path, a computer network consisting of a plurality of resistors of selected weighted values, means for mixing the selected carrier component signals in different resistor portions of said network, means for combining the mixed carrier signals in the output of each of the several resistor portions in two groups in separate circuits, means for amplifying the combined waves as alternating voltages, rectifying the amplified waves and combining the rectified waves in each of said separate circuits associated with each of said different resistor portions to produce a plurality of error signal direct currents equal in number to the number of networks in said common path, the amount of each of which currents is proportional to the sum of the squares of the integrated departures from normal of the voltage levels of all the individual carrier channels in the output of said path, and means for applying said error signal currents respectively to different ones of said networks in such manner as to cause the amplitude of the corrective shaping loss inserted thereby to vary proportionally and so that the sum of the inserted losses of all the networks at that repeater point is such as to effectively compensate for the undesired transmission variations in the preceding section of the system.

3. In a multiplex carrier signal transmission system having $n$ carrier channels and including a transmission line and a plurality of repeaters for amplifying the transmitted carrier signals, spaced at different points along said line, a deviation regulator at at least one repeater point for automatically counteracting undesired variations in the carrier signals due to the effects of extreme temperatures and other unpredictable variable transmission conditions on the line and repeaters in the preceding section of the system, said regulator comprising $m$ thermistor-controlled variable loss networks connected in tandem in a common transmission path of the signals of all the $n$ carrier channels at that repeater point, said networks being respectively adapted to insert into said path corrective losses of different linearly independent shapes corresponding to functions represented by different terms of an orthogonal polynomial series, and means for controlling the impedance of the thermistor associated with each of said networks and thus the amplitude of the loss inserted thereby into said path on a least-squared-residual error basis comprising one main portion common to the controls for all of said networks and $m$ branch portions respectively individual to the control for a different one of said $m$ networks, said main portion comprising a pick-off amplifier having its input connected across the output of said common path and $n$ channel filters respectively adapted to select the different component carrier signals of each of said $n$ carrier channels, having their inputs connected in parallel across the output of said pick-off amplifier and each of said branch portions comprising a different set of $n$ resistors of selected weighted values respectively connected in tandem with the output of a different one of said $n$ filters, means for combining in two separate circuits the thus weighted output energies of each of said $n$ filters in two groups respectively including those of a different portion of said $n$ filters, and a control circuit for each of said $m$ networks, the control circuit for each of said $m$ networks comprising two alternating-current amplifiers having their inputs respectively connected to the output of a different one of said two separate circuits of the branch portion for that network so as to respectively amplify the weighted output energies of a portion of the $n$ filters, combined in each of these separate circuits, two oppositely poled rectifiers respectively connected to the output of a different one of said alternating-current amplifiers, so as to rectify the outputs of the two alternating-current amplifiers in order to produce two oppositely poled direct current voltages, a direct-current amplifier having its input connected in series with the outputs of the two oppositely poled rectifiers so that the positive and negative direct current voltages respectively appearing in the outputs of these respective rectifiers are summed in the input of that amplifier, and its output connected to the termistor of the associated variable loss network so as to supply heating current thereto, any error voltage appearing in the input of said direct-current amplifier due to the substantial departures from normal of the levels of the $m$ carrier channels in the output of said common path of the repeater causing a corresponding change in the heating current to said thermistor and thus a proportional change in the amplitude of the shaping loss inserted in that path by the associated network.

4. The combination of claim 2, in which said networks have respective loss versus frequency characteristics approximating straight line slope, parabolic, cubic, and quartic shapes corresponding to functions represented by respectively different terms of an orthogonal polynominal series.

5. The combination of claim 2, in which said networks are four in upmber, two of said networks have respective loss versus frequency characteristics of straight line slope and bulge shapes corresponding to functions represented by the second and third terms, respectively, of a Legendrian polynomial series, the other two of said networks have respective loss versus frequency characteristics of cubic and quartic shapes corresponding to functions represented by the third and fourth terms, respectively, of a Legendrian orthogonal series, and the number of resistors in each of said different portions of said computer networks equals the number of carrier channels in said system.

6. The system of claim 3, in which said weighted resistors constitute means to proportion the error signal current supplied as heating current to the thermistor of each of said networks to the sum of the squares of the integrated voltage deviations from normal of the level of all carrier channels at the output of said common path.

References Cited in the file of this patent

UNITED STATES PATENTS

| | | |
|---|---|---|
| 1,743,132 | Green | Jan. 14, 1930 |
| 1,956,547 | Black | May 1, 1934 |